United States Patent [19]

Kreuter

[11] Patent Number: 4,467,956

[45] Date of Patent: Aug. 28, 1984

[54] SYSTEM FOR SUPPLYING CONDITIONED AIR, THERMOSTAT THEREFOR AND METHODS OF MAKING THE SAME

[76] Inventor: Kenneth G. Kreuter, 1230 Centennial Dr., Thief River Falls, Minn. 56701

[21] Appl. No.: 440,517

[22] Filed: Nov. 10, 1982

[51] Int. Cl.³ .............................................. F24F 7/06
[52] U.S. Cl. ...................................... 236/49; 236/51; 236/80 R
[58] Field of Search .......................... 236/49, 51, 80 R

[56] References Cited

U.S. PATENT DOCUMENTS

| | | | |
|---|---|---|---|
| 3,719,321 | 3/1973 | McNabney | 236/49 |
| 3,941,310 | 3/1976 | Travaglio et al. | 236/49 |
| 4,077,567 | 3/1978 | Ginn et al. | 236/49 |
| 4,147,298 | 4/1979 | Leemhuis | 236/49 |
| 4,263,931 | 4/1981 | Bramow et al. | 236/49 X |
| 4,264,035 | 4/1981 | Maxson et al. | 236/49 X |
| 4,428,529 | 1/1984 | Bentsen | 236/49 |

OTHER PUBLICATIONS

Admitted Prior Art System for Supplying Conditioned Air as Shown in FIG. 1 of This Application.

Primary Examiner—William E. Tapolcai
Attorney, Agent, or Firm—Candor, Candor & Tassone

[57] ABSTRACT

A system for supplying conditioned air through a duct to an area to be treated by the conditioned air, the system having an area thermostat that tends to maintain the temperature of the area at a selected set point temperature of the thermostat. The thermostat provides a signal in relation to the temperature sensed by the thermostat. A damper unit is provided for controlling the flow of air from the duct to the area. A controller that is non-readily accessible in the area and is remote from the thermostat directs a signal to the damper unit to operate the same in relation to the value of the signal of the thermostat and in relation to the air pressure in the duct to compensate for pressure changes originating elsewhere in the system whereby the controller tends to maintain the air flow to the area at the rate called for by the signal of the thermostat regardless of the air pressure in the duct. Adjustable maximum and minimum air flow rate setting devices are provided for selecting the air flow rate range of the air flow from the duct to the area under the control of the controller. The adjustable maximum and minimum air flow rate setting devices are remote from the controller and are readily accessible in the area while being operatively associated with the thermostat to select the range of the signal thereof and, thus, the range of the rate of the air flow from the duct.

18 Claims, 9 Drawing Figures

SYSTEM FOR SUPPLYING CONDITIONED AIR, THERMOSTAT THEREFOR AND METHODS OF MAKING THE SAME

BACKGROUND OF THE INVENTION

1. Field of the Invention

This invention relates to an improved system for supplying conditioned air through duct means to an area to be treated by the conditioned air and to a method of making the same as well as to a thermostat for such a system or the like.

2. Prior Art Statement

It is known to provide a system for supplying conditioned air through duct means to an area to be treated by the conditioned air, the system comprising an area thermostat that tends to maintain the temperature of the area at a selected set point temperature of the thermostat and having means providing a pneumatic signal in relation to the temperature sensed by the thermostat, a pneumatically operated damper means for controlling the flow of air from the duct means to the area, a controller having means for directing a pneumatic signal to the damper means to operate the same in relation to the pressure of the pneumatic signal of the thermostat and in relation to the air pressure in the duct means to compensate for pressure changes originating elsewhere in the system whereby the controller tends to maintain the air flow to the area at the rate called for by the pneumatic signal of the thermostat regardless of the air pressure in the duct means, and adjustable maximum and minimum air flow rate setting devices for selecting the air flow rate range of the air flow from the duct means to the area under the control of the controller.

Figure 1:
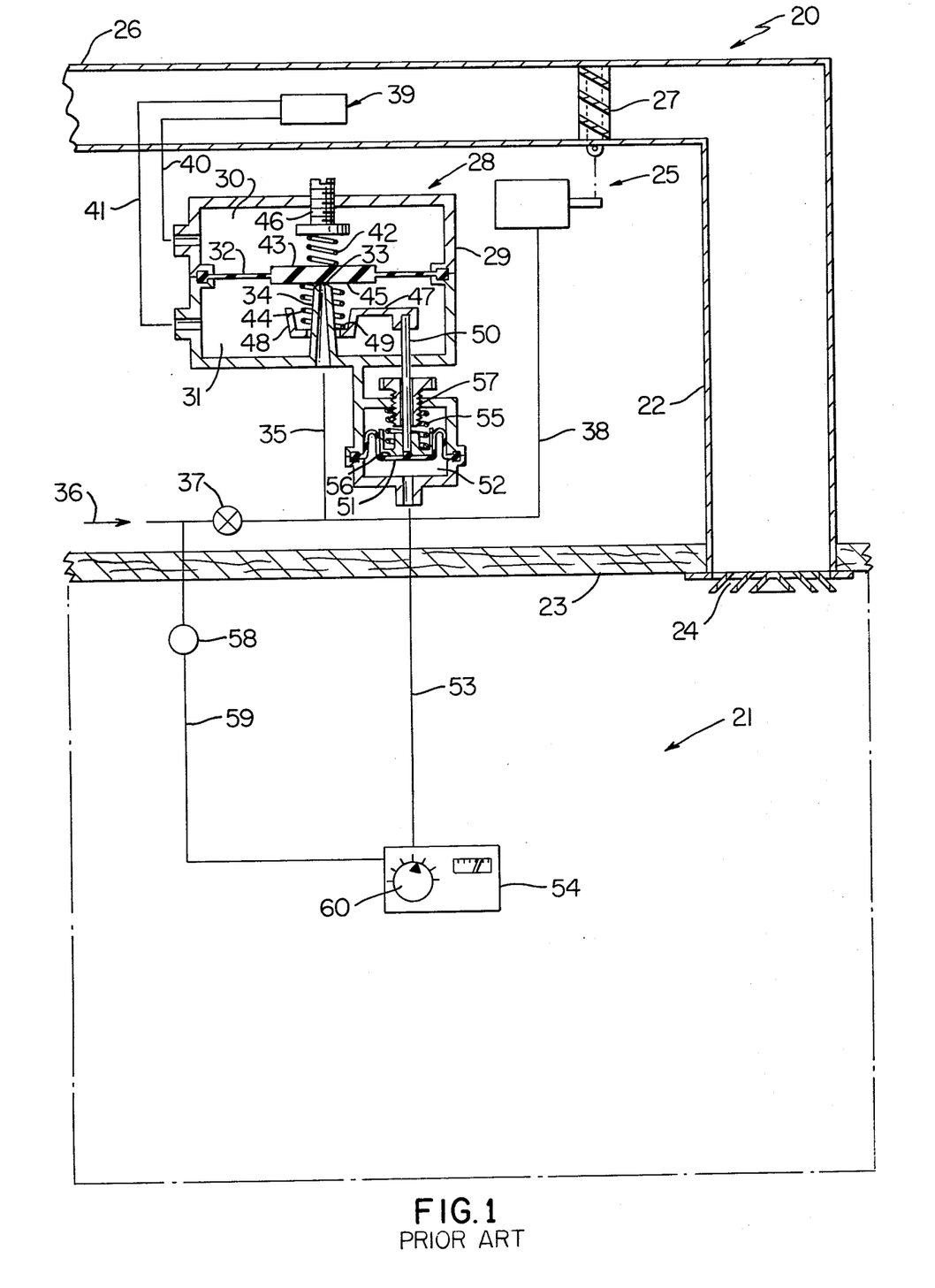
FIG. 1 is a schematic view, partially in cross section, illustrating a prior known system for supplying conditioned air through duct means to an area to be treated by the conditioned air.

For example, see the prior art system depicted in FIG. 1 of this application.

It can be seen that the maximum and minimum air flow rate setting devices of the prior known system of FIG. 1 are disposed in the controller which is mounted in the ceiling of the building containing the system and do not change the pressure range of the pneumatic signal produced by the thermostat.

SUMMARY OF THE INVENTION

It is one feature of this invention to provide an improved system for supplying conditioned air through duct means to an area to be treated by the conditioned air.

In particular, it was found according to the teachings of this invention that a maintenance problem is provided in the prior known systems whenever an adjustment to the minimum and maximum air flow rate setting devices of the system must take place after the system has been installed because the maintenance person must reach the controller that is mounted in the ceiling and thereby must remove part of the ceiling arrangement by the use of a ladder, etc. and thereby not only disrupt the working personnel in the area being treated by the system, but also might cause damage to the ceiling material by accidentally dropping the same, etc.

Thus, it was found according to the teachings of this invention that an improved thermostat for such a system can be provided wherein the maximum and minimum air flow rate setting devices of the system can be carried in the housing means of the thermostat so as to be disposed remote from the controller of the system and be readily accessible in the area being conditioned by the system as such thermostat is normally mounted on a wall of the area at body height so that ladders and the like are not required to adjust the maximum and minimum air flow rate setting devices as will be apparent hereinafter.

For example, one embodiment of this invention provides a system for supplying conditioned air through duct means to an area to be treated by the conditioned air, the system comprising an area thermostat that tends to maintain the temperature of the area at a selected set point temperature of the thermostat, the thermostat having means providing a pneumatic signal in relation to the temperature sensed by the thermostat, a pneumatically operated damper means for controlling the flow of the air from the duct means to the area, a controller having means for directing a pneumatic signal to the damper means to operate the same in relation to the pressure of the pneumatic signal of the thermostat and in relation to the air pressure in the duct means to compensate for pressure changes originating elsewhere in the system whereby the controller tends to maintain the air flow to the area at the rate called for by the pneumatic signal of the thermostat regardless of the air pressure in the duct means, and adjustable maximum and minimum air flow rate setting devices selecting the air flow rate range of the air flow from the duct means to the area under the control of the controller, the adjustable maximum and minimum air flow rate setting devices being remote from the controller and being readily accessible in the area.

Accordingly, it is an object of this invention to provide an improved system for supplying conditioned air through duct means to an area to be treated by the conditioned air, the system of this invention having one or more of the novel features of this invention as set forth above or hereinafter shown or described.

Another object of this invention is to provide a method for making such a system, the method of this invention having one or more of the novel features of this invention as set forth above or hereinafter shown or described.

Another object of this invention is to provide an improved thermostat for such a system or the like, the thermostat of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter described and illustrated as being particularly adapted to provide conditioned air, such as heated air and/or cooled air, to an area of a building through a ceiling mounted duct means, it is to be understood that the various features of this invention can be used singly or in any combination thereof to provide air flow for other purposes and in other arrangements as desired.

Therefore, this invention is not to be limited to only the embodiments illustrated in the drawings, because the drawings are merely utilized to illustrate one of the wide variety of uses of this invention.

It is believed that in order to fully understand the improved features of this invention, a general discussion of a prior known system for supplying conditioned air through duct means to an area to be treated by the conditioned air is necessary whereby reference is now made to FIG. 1 wherein such prior known system is generally indicated by the reference numeral 20 and comprises an area 21 of a building (not shown) that is to be treated with conditioned air, such as heated air and/or cooled air, that is supplied to the area 21 by conventional duct means 22 mounted above the area ceiling 23 in a conventional manner, the duct means 22 having an outlet 24 at the ceiling 23 through which the conditioned air flows to condition the area 21.

The duct means 22 includes a pneumatically operated damper means that is generally indicated by the reference numeral 25 and is adapted to control the rate of flow of the air through the duct means 22 as the same flows from an inlet end 26 thereof to the outlet 24 thereof by positioning a louvre or vane means 27 that is disposed in the duct means 22 in a conventional manner.

The pneumatically operated damper means 25 is operated under the control of a controller that is generally indicated by the reference numeral 28 and comprises a housing means 29 being separated into two chambers 30 and 31 by a flexible diaphragm 32 that controls the opening 33 of a bleed nozzle means 34 that is interconnected by suitable conduit means 35 to a pneumatic source conduit 36 that supplies pneumatic fluid to the conduit 35 through a restrictor means 37 and conduit means 38, the conduit means 38 also being interconnected to the pneumatically operated damper means 25.

A sensing element 39, such as a Pitot tube, is disposed in the duct means 22 and senses, in a conventional manner, the high pressure or total pressure of the air flowing through the duct means 22 from the inlet 26 to the outelt 24 thereof and transmits such high or total air pressure through a conduit means 40 to the chamber 30 of the controller 28. Likewise, the sensor 39 senses the low or static pressure of the air in the duct means 22 and transmits the same through conduit means 41 to the chamber 31 of the controller 28.

In this manner, the position of the diaphragm 32 is determined by the pressure differential of the high and low pressures acting in their respective chambers 30 and 31 on the diaphragm 32, such movement of the diaphragm 32 also being controlled by the force of a compression spring 42 acting on the side 43 of the diaphragm 32 and the force of a compression spring 44 acting on the opposite side 45 of the diaphragm 32.

The force of the compression spring 42 is controlled by the position of an adjustable member 46 for a purpose hereinafter described.

The force of the compression spring 44 is controlled by the position of a spring retainer 47 having an end 48 against which the lower end 49 of the spring 44 rests, the position of the retainer 47 being controlled by a plunger 50 fixed to the retainer 47 and being operatively interconnected to a flexible diaphragm 51 carried by the housing means 28 and cooperating therewith to define a chamber 52 that is interconnected by a conduit means 53 to a pneumatically operated area thermostat 54 for a purpose hereinafter described.

A compression spring 55 bears against the upper side 56 of the diaphragm 51 and upward movement of the diaphragm 51 is limited by the position of a threaded stop member 57 for a purpose hereinafter described.

The pneumatically operated thermostat 54 includes a bleed means (not shown) which receives pneumatic fluid from the source 36 through a restrictor 58 in a conduit means 59 so that the pressure value of the signal being sent by the thermostat 54 through the conduit 53 to the chamber 52 is in relation to the temperature being sensed by the thermostat 54 in the area 21. The set point temperature of the thermostat 54 is set by the selector knob 60 in a manner well known in the art.

Thus, when the thermostat 54 is set to tend to maintain a selected temperature within the area 21 and the conditioned air is cooled air, the force of the signal being sent by the thermostat through the conduit 53 to the chamber 52 increases upon a demand for increased fluid flow through the duct means 22 to the area 21 to cool the area 21. An increase in the pressure value in the chamber 52 causes the plunger 50 to move upwardly in FIG. 1 in opposition to the force of the compression spring 55 to move the spring retainer 47 upwardly in FIG. 1 and thereby increase the force of the compression spring 44 tending to move the diaphragm 32 away from the opening 33 of the bleed nozzle 34 and thereby decrease the pressure value of the pneumatic signal being directed by the source 36 through the restrictor 37 to the pneumatically operated damper means 25. Accordingly, the damper means 25 changes the position of the vanes 27 to provide a greater air flow rate through the duct means 22 to the area 21 whereby this greater air flow will tend to cool the area 21 down to the set point temperature of the thermostat 54.

Conversely, should the thermostat 54 be sensing a temperature that requires a decrease in the air flow rate through the duct means 22 to the area 21 because the temperature in the area 21 being sensed by the thermostat 54 is cooler than the set point of the thermostat 54, a decrease in the pressure value is provided in the chamber 52 of the controller 28 by the thermostat 54 so that the force of the compression spring 55 moves the diaphragm 51 downwardly and thereby moves the spring retainer 47 downwardly so that the force of the compression spring 44 acting on the diaphragm 32 is decreased and thereby permits the diaphragm 32 to move closer to the opening 33 of the nozzle 34. In this manner, an increase in the pressure value of the signal being sent by the conduit 38 to the damper means 25 is provided so that the damper means 25 will move the louvre means 27 in a closed direction thereof to thereby decrease the rate of fluid flow through the duct means 22 to the area 21 whereby this lesser air flow will permit the temperature in the area 21 to rise to the set point temperature of the thermostat 54.

However, independently of the operation of the thermostat 54, should the pressure value of the air in the conduit means 22 at the inlet end 26 vary for reasons other than by changes in the system 20 itself, such change in the pressure value is recognized by the pressure differential acting across the diaphragm 32 because of the high pressure in the chamber 30 and the low pressure in the chamber 31 to thereby cause the bleed means 34 to operate the damper means 25 to provide for the air flow rate called for by the signal pressure of the thermostat 54 regardless of duct pressure so as to maintain pressure independent control.

In order to determine the maximum and minimum air flow rates and thus the range for the air flow from the duct means 22 into the area 21, the position of the adjustable member 46 provides the minimum rate and the position of the adjustable member 57 provides the maximum rate. In particular, the position of the member 57 prevents the diaphragm 51 from moving further upwardly when the same engages against the adjusting member 57 so that the opening force of the spring 44 cannot provide for further reduction in the value of the pressure signal to the damper means 25 to further open the vanes 27. The adjusting member 46 provides the minimum flow rate through the duct means 22 by setting the force of the compression spring 42 in opposition to the force of the spring 44 whereby the diaphragm 32 will fully close off the opening 33 of the nozzle 34 at a certain falling pressure value of the signal from the thermostat 54 to provide for the pneumatic signal to the damper 25 to move the vanes to their most closed position to provide for the minimum flow rate therethrough.

As previously stated, should a person desire to adjust the minimum and maximum settings for the range of the rate of flow of air through the duct means 22, that person must open the ceiling 23 in order to be provided with access to the controller 28 to adjust the members 46 and/or 57 so as to change the range of operation of the system 20.

However, as also previously set forth, it is one feature of this invention to provide for the adjustment of the minimum and maximum air flow rate setting devices for selecting the air flow rate range of the air flow from the duct means to the area under the control of the controller in such a manner that the maximum and minimum air flow rate setting devices are remote from the controller and are readily accessible in the area being treated by the air.

For example, such a system of this invention is generally indicated by the reference numeral 70 in FIG. 2 and comprises a duct means 71 having an outlet 72 at the ceiling 73 of an area 74 that is to be treated by the conditioned air being directed by the duct means 71 from the inlet 75 thereof to the outlet 72 under the control of a pneumatically operated damper means 76 in a manner hereinafter set forth.

The system 70 includes a controller 77 of this invention that has a flexible diaphragm 78 that controls the opening 79' of a bleed nozzle 79 and that divides the housing means 80 of the controller 77 into two chambers 81 and 82.

The chamber 81 of the controller 77 is interconnected to the high pressure being sensed by an air pressure sensor 83 that is disposed in the duct means 71 by a conduit means 84 while the chamber 82 is interconnected by a conduit 85 to the low pressure being sensed by the sensor 83.

Figure 2:
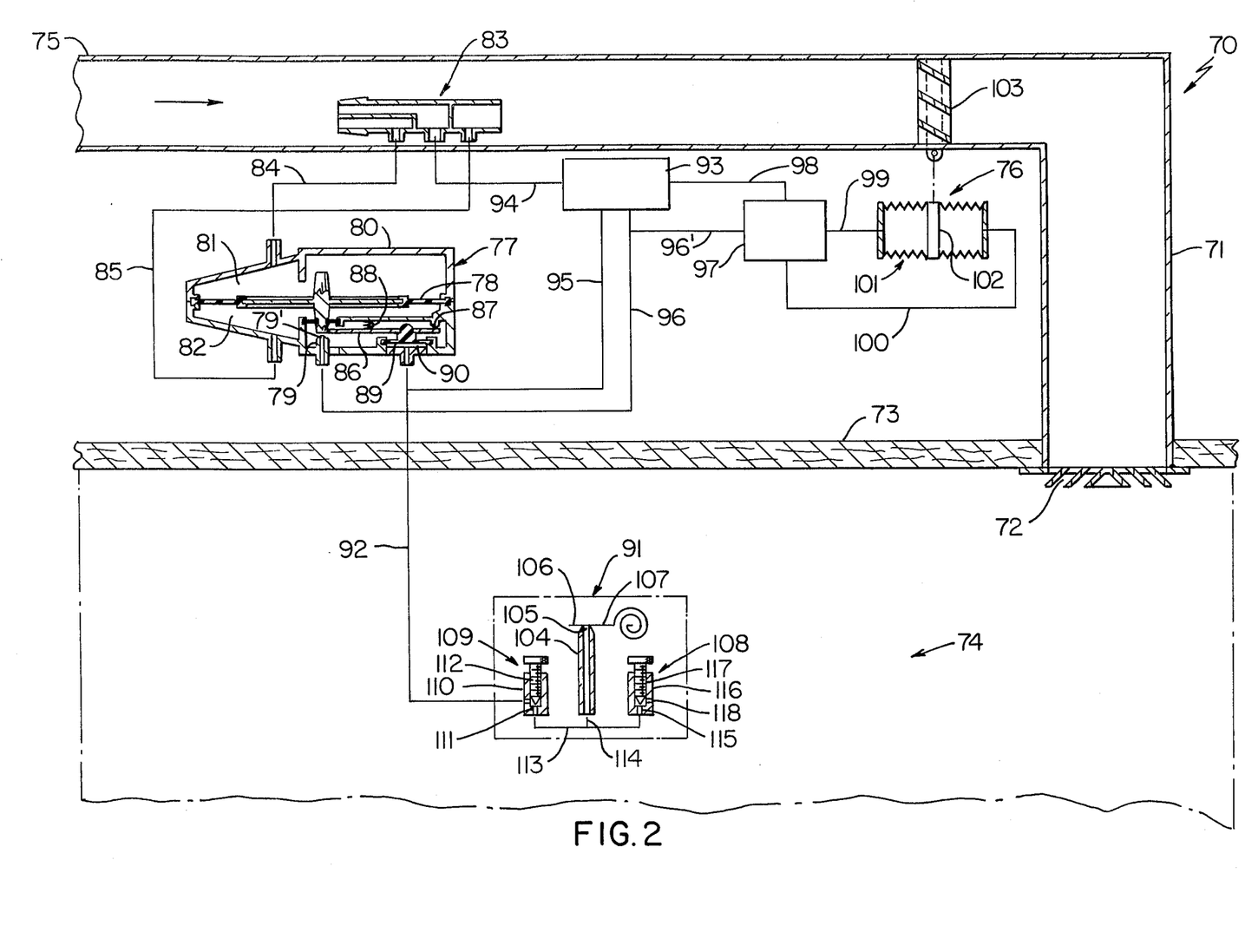
FIG. 2 is a view similar to FIG. 1 and illustrates the improved system of this invention for supplying conditioned air through duct means to an anrea to be treated by the conditioned air.

A pivotally mounted lever 86 is disposed in the controller 77 and is adapted to pivot on a point 87 in a clockwise direction in opposition to the force of a compression spring 88 that tends to urge the lever 86 in a counterclockwise direction in FIG. 2. A diaphragm 89 is interconnected to the lever 86 and defines a chamber 90 that is adapted to receive a pneumatic signal from an area thermostat of this invention that is generally indicated by the reference numeral 91 in FIG. 2 and is interconnected to the chamber 90 by a conduit means 92.

The system 70 utilizes the pressure of the conditioned air in the duct means 71 for the pressure source for the operation of the controller 77, pneumatically operated damper means 76 and thermostat 91.

For example, a pressure regulator 93 is provided for the system 70 and operates in a manner well known in the art to receive pressure from a source conduit means 94 and deliver regulated pressure therefrom at a constant value through conduit means 95 and 96, the conduit means 95 leading to the conduit means 92 for the thermostat 91 while the conduit means 96 leads to the bleed nozzle 79 as well as through a branch conduit means 96' to a relay 97. The relay 97 is adapted to direct unregulated pressure from a conduit means 98 of the pressure regulator 93 to either a conduit means 99 or a conduit means 100 which operate a bellows arrangement 101 of the damper means 76 to position a member 102 that is operatively interconnected to the louvres or vanes 103 of the damper means 76 to thereby hold the louvres or vanes 103 in a more open condition thereof or a more closed condition thereof as will be apparent hereinafter. The pressure source conduit 94 for the pressure regulator 93 can be interconnected to a high pressure side of the sensor 83 as illustrated in FIG. 2 so that the sensor 83 provides a source of fluid pressure for the regulator 93.

The thermostat 91 of this invention includes a bleed nozzle means 104 that has its opening 105 opened and closed by an end 106 of a bimetal temperature sensing member 107 that has its set point selected in a manner conventional in the art for a bimetal operated bleed nozzle means. The bimetal member 107 is arranged for a cooling operation of the system 70 whereby when the bimetal member 107 senses a temperature above the selected set point temperature thereof, the same has its end 106 moved closer to the opening 105 of the nozzles means 104 whereas in contrast, the end 106 of the bimetal member 107 moves away from the opening 105 of the nozzle means 104 when the same senses a temperature below the temperature setting of the set point means for the bimetal member 107 as will be apparent hereinafter.

The improved thermostat 91 of this invention includes maximum and minimum air flow rate setting devices that are respectively and generally indicated by the reference numerals 108 and 109 in FIG. 2 with the devices 108 and 109 comprising valve means of the needle type as illustrated.

In particular, the minimum air flow rate setting device 109 has a housing means 110 provided with a valve seat 111 that has the flow rate therethrough controlled by an adjustable needle valve member 112 in a manner conventional in the valve art while the inlet side of the valve seat means 111 is interconnected to the conduit 92. The outlet side of the valve seat 111 is interconnected by a conduit 113 to a branch conduit 114 that leads to the nozzle means 104, the conduit 113 also leading to the inlet side of a valve seat 115 of a housing means 116 of the maximum air flow rate setting device 108. The flow rate through the valve seat 115 of the maximum air flow rate setting device 108 is controlled by an adjustable needle valve member 117 in a manner conventional in the valve art so as to control the rate of flow from the valve seat 115 to a vent opening 118 that leads to the atmosphere for a purpose hereinafter set forth.

In this manner, it can be seen that the devices 108 and 109 provide the maximum and minimum pressure values for the range of the pneumatic signal that the nozzle means 104 can provide in the conduit 92 that leads to the chamber 90 of the controller 77.

In particular, once the members 112 and 117 have been adjusted to the desired positions thereof, it can be seen that when the bimetal member 107 is providing the maximum opening of the opening 105 of the nozzle, the minimum air flow rate setting device 109 will permit only a certain amount of fluid in the conduit 92 to be bypassed out through the opening 105 of the nozzle 104 so that a minimum pressure value is provided in the conduit 92 and, thus, to the chamber 90 of the controller 77 for a purpose hereinafter set forth.

When the bimetal member 107 has the opening 105 of the bleed nozzle means 104 completely closed, the pressure buildup in the conduit 92 from the pressure regulator 93 is only to the value permitted by the maximum air flow rate setting device 108 as the same is interconnecting the conduit 92 to the vent opening 118. In this manner, the pressure value in the conduit 92 can never build up greater than permitted by the setting of the device 108 even when the nozzle opening 105 is being completely closed by the bimetal member 107.

Figure 3:
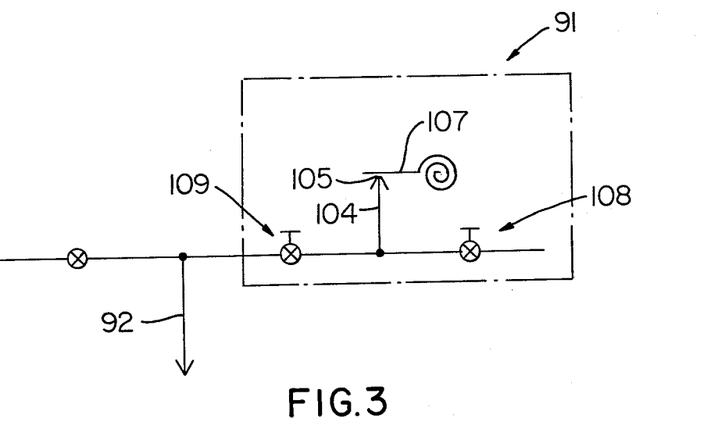
FIG. 3 is a schematic view of just the thermostat of this invention that is utilized in the system of this invention that is illustrated in FIG. 2.
Figure 4:
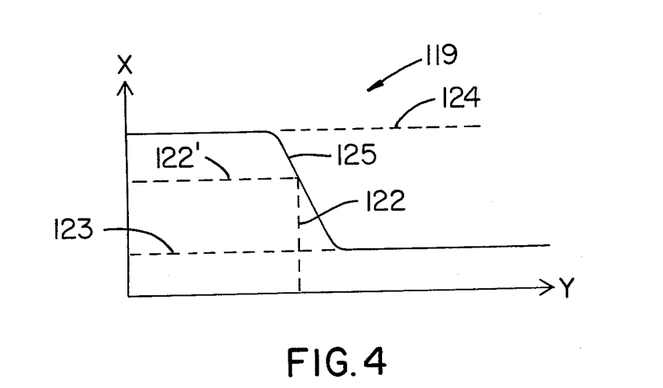
FIG. 4 is a graph illustrating the operation of the thermostat of FIG. 3.

This arrangement for the thermostat 91 of this invention is schematically illustrated in FIG. 3 and is represented by the graph 119 of FIG. 4 wherein the X axis represents increasing room temperature and the Y axis indicates increasing pressure value of the pressure signal from the thermostat 91 in the conduit 92 to the chamber 90 of the controller 77.

The dotted vertical line 122 represents the selected set point temperature setting for the thermostat 91. The dotted horizontal line 123 represents the minimum pressure value setting of the device 109 and the dotted horizontal line 124 represents the maximum pressure value setting of the device 108. Thus, with the opening 105 of the nozzle means 104 of the thermostat 91 fully closed, the thermostat 91 can only produce a signal with the maximum pressure value that is represented by the line 124 and when the opening 105 of the nozzle means 104 is fully open, the thermostat 91 can produce a signal that has the minimum pressure value that is represented by the line 123. Of course, the position of the lines 123 and 124 and, thus, the minimum and maximum values are adjustable within limits as represented by the adjustment of the needle valve members 109 and 108 in the manner previously set forth.

In any event, it can be seen that the angled full line 125 of the graph 119 represents the values of the pressure signals that will be produced by the thermostat 91 for the particular minimum and maximum setting thereof as represented by the lines 123 and 124 when the same have a selected set point represented by the line 122. Thus, When the temperature of the area is at the set point temperature, the pressure value of the signal from the thermostat 91 is represented by the horizontal line 122'.

Figure 6:
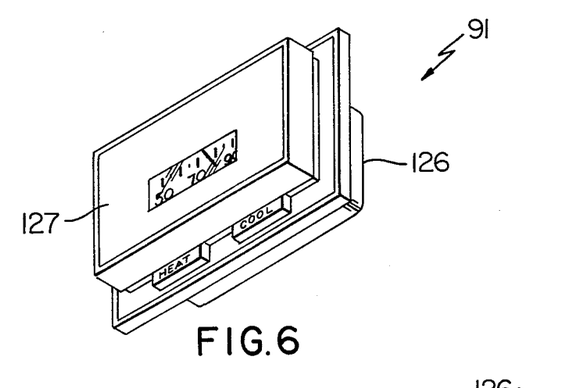
FIG. 6 is a perspective view illustrating one embodiment of the thermostat of this invention.
Figure 7:
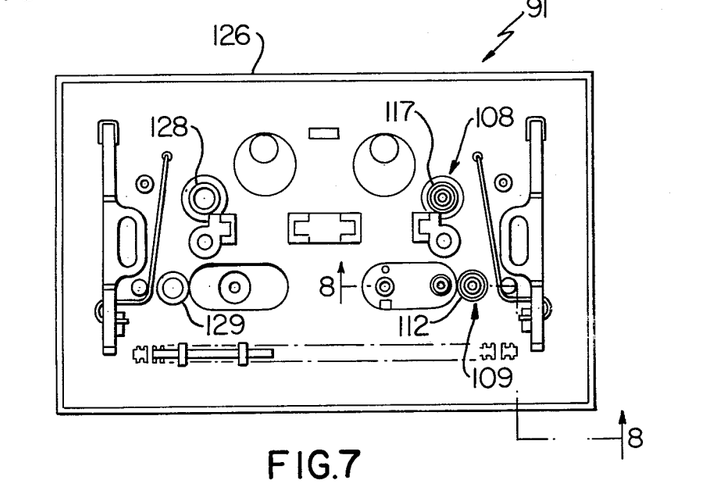
FIG. 7 is an enlarged front view of the thermostat of FIG. 6 with the cover member thereof removed.
Figure 8:
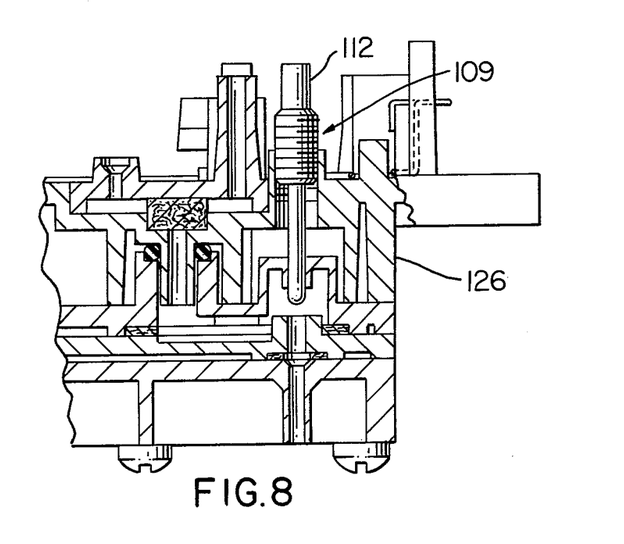
FIG. 8 is an enlarged fragmentary cross-sectional view taken on line 8—8 of FIG. 7.

While the thermostat 91 of this invention can take any general configuration and function in the manner previously set forth, one embodiment thereof is illustrated in FIGS. 6–8 wherein it can be seen that the maximum and minimum air flow rate setting devices 108 and 109 respectively have their adjustable members 117 and 112 fully accessible within a housing means 126 of the thermostat 91 when a cover member 127 thereof has been removed as illustrated in FIG. 7.

While the devices 108 and 109 illustrated in FIGS. 7 and 8 are provided for the cooling operation of the system 70 of this invention, it is to be understood that similar devices 108 and 109 are provided for the heating cycle of the system 70 and would respectively be at the locations 128 and 129 of FIG. 7 and a bimetal controlled nozzle means similar to the nozzle means 104 is provided in combination therewith.

Figure 9:
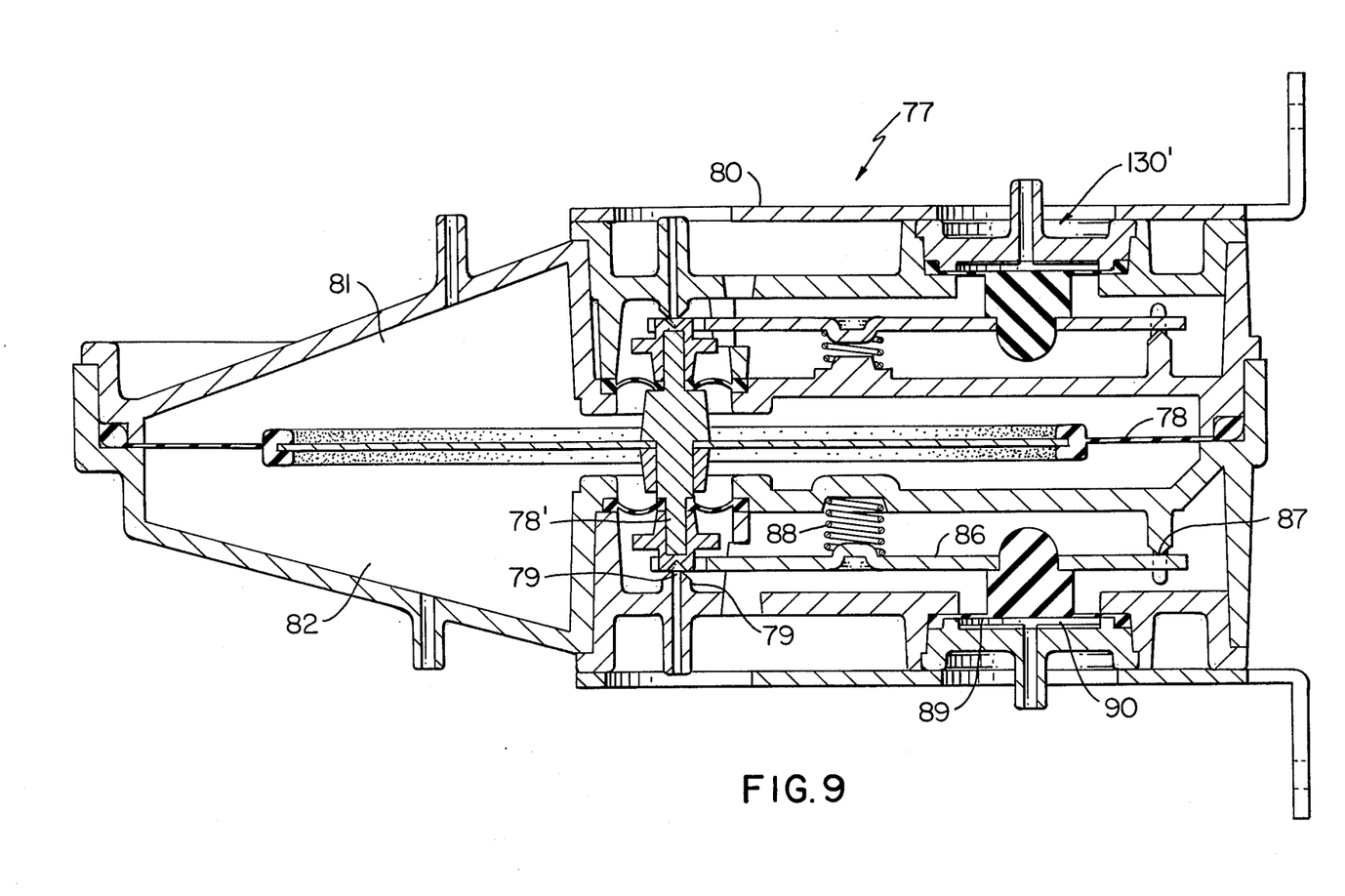
FIG. 9 is an enlarged cross-sectional view of the controller of this invention that is utilized in the system of this invention that is illustrated in FIG. 2.

In addition, while the controller 77 of this invention can take any suitable configuration and structure to function in the manner previously set forth, the present preferred embodiment thereof is illustrated in detail in FIG. 9 and the same includes an override mechanism that is generally indicated by the reference numeral 130' but since the override mechanism 130 is not relevant to understanding this invention, the details of the override means 130' will not be further described.

However, it can readily be seen in FIG. 9 that the structure for providing the pneumatic signal out of the nozzle means 79 to the relay 97 for the pneumatically operated damper 76 is substantially the same as the structure for the controller 77 illustrated in FIG. 2 and previously described whereby further details of the controller 77 are not necessary in order to fully understand the various features of this invention.

Therefore, it can be seen that the system 70 of this invention can be formed from relatively few parts in a relatively simple manner by the method of this invention to operate in the manner now to be described.

With the maximum and minimum air flow rate setting devices 108 and 109 having been initially set so as to provide the minimum and maximum pressure values for the pneumatic signal, such as represented by the lines 123 and 124 in FIG. 4, and with the set point adjustment for the bimetal member 107 having been selected to select a particular temperature, such as represented by the line 122 of FIG. 4, the system 70 will tend to maintain the temperature in the area 74 at the selected temperature for the thermostat 91.

In particular, should the temperature in the area 74 being sensed by the bimetal member 107 rise above the selected set point temperature of the bimetal member 107 while the system 70 is in a cooling cycle thereof, the bimetal member 107 moves closer to the opening 105 of the nozzle 104 to increase the pressure signal in the conduit 92 which acts in the chamber 90 of the controller 77 to pivot the lever 86 in a clockwise direction in opposition to the force of the compression spring 88 to move a diaphragm member 78' away from the opening 79' of the nozzle means 79 so as to decrease the value of the pneumatic signal in the conduit 96 that leads to the relay 97 through the branch conduit 96' whereby the relay 97 will cause the pneumatically operated damper 76 to open the louvres 103 to a greater extent and thereby provide a greater flow of conditioned or cooled air through the duct means 71 and out through the outlet 72 into the area 74 to thereby permit the temperature of the area to decrease to the selected temperature thereof.

Should the temperature in the area 74 rise above a temperature that causes the bimetal member 107 to fully close against the opening 105 of the nozzle means 104, the maximum pressure value of the signal in the conduit 92 that is obtainable has been set by the maximum air flow rate setting device 108 so that the pressure value in the conduit 92 cannot exceed that limit and, thus, the controller 77 cannot cause the pneumatically operated damper 76 to increase the air flow rate through the louvre means 103 amd, thus, out of the outlet 72 of the duct means 71 at any greater amount than provided by the setting of the device 108.

Conversely, should the temperature in the area 74 decrease beyond the selected set point setting of the bimetal member 107, the bimetal member 107 causes its end 106 to move away from the opening 105 of the nozzle means 104 and thereby reduce the value of the pressure of the signal in the conduit 92 to cause the compression spring 88 in the controller 77 to pivot the lever 86 in a counterclockwise direction and thereby permit the diaphragm member 78' to further close the opening 79' of the nozzle means 79 so that the pneumatic signal in the conduit means 96 increases and thereby causes the relay 97 to operate the damper 76 in a manner to tend to close the louvres 103 to decrease the amount of air flow out of the outlet 72 of the duct means 72 and thereby permit the temperature in the area 74 to rise to the selected temperature.

During the operation of the thermostat 91 when the temperature in the area 74 is below the set point setting of the bimetal member 107, should the temperature in the area 74 be such that the same causes the bimetal member 107 to move fully away from the nozzle means 104, the minimum air flow rate setting device 109 has determined that the pressure value of the pneumatic signal in the conduit 92 will not fall below a certain pressure value thereof so that the controller 77 cannot cause the damper 76 to close the louvres 103 beyond a certain air flow rate. In this manner there will always be a certain minimum air flow out of the conduit means 71 into the area 74 which cannot decrease below the particular settings of the device 109.

However, as previously stated, should an operator desire to change the maximum and/or minimum settings of the thermostat 91 so as to change the range of operation of the air flow being controlled by the controller 77, the operator need only remove the cover 127 from the housing means 126 of the thermostat 91 and adjust the adjustable members 117 and 112 of the respective devices 108 and 109 to change the particular settings thereof to either narrow the range or broaden the range as the case may be and the system 70 will operate in exactly the same manner as previously described except that the minimum and maximum air flow rates through the duct means 71 will have been changed in the manner previously set forth.

As previously set forth, the controller 77 also functions to compensate for any pressure changes originating in the building containing the system 70 that would change the pressure value of the fluid being directed into the inlet 75 of the duct means 71 by controlling the opening and closing of the nozzle means 79 through the position of the diaphragm 78 being acted upon by the pressure differential caused by the pressures in the chambers 81 and 82 that respectively receive the sensed high pressure and low pressure of the air in the duct 71 as sensed by the sensor 83 in the manner previously set forth for the prior art system 20 whereby this operation of the controller 77 need not be repeated in connection with the system 70 of this invention.

While the system 70 and the thermostat 91 thereof have been illustrated and described as utilizing the air pressure in the duct means 71 as the source of operating pressure, it is to be understood that a separate pressure source can be provided therefor, if desired.

However, it has been found that when a separate source of pressure for supplying the operating pressure in the conduits 95 and 96 respectively for the controller 77 and thermostat 91 ranges between 0–20 psi, the valve means for providing the maximum and minimum flow devices 108 and 109 should be ball regulators rather than needle valve means which are preferred when the pressure source for supplying the operating pressure in the conduits 95 and 96 is a low pressure source, such as 0–0.4 inches H$_2$O that is provided when utilizing the air pressure in the duct means 71 in the manner previously described.

Figure 5:
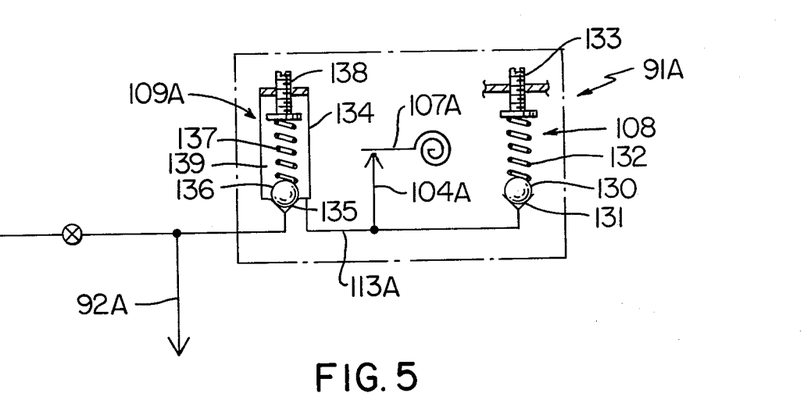
FIG. 5 is a view similar to FIG. 3 and illustrates another embodiment of the thermostat of this invention.

For example, reference is now made to FIG. 5 wherein another thermostat of this invention is generally indicated by the reference numeral 91A and parts thereof similar to the thermostat 91 of FIG. 3 are indicated by like reference numerals followed by the reference letter "A".

As illustrated in FIG. 5, the thermostat 91A is substantially the same as the thermostat 91 previously described except that the maximum air flow rate setting device 108A comprises a ball valve member 130 urged against a valve seat 131 by a compression spring 132 that has its force adjusted by a threaded adjusting member 133 that corresponds to the threaded adjusting member 117 of the maximum air flow rate device 108 previously described.

Similarly, the minimum air flow rate setting device 109A comprises a housing 134 having an inlet valve seat 135 controlled by a ball valve member 136 that is urged to its closed position against the inlet valve seat 135 by a compression spring 136 that has its compressive force controlled by a threaded adjusting member 138 that corresponds to the adjusting member 112 of the minimum air flow rate device 109 previously described. The inlet 135 is adapted to be interconnected to a chamber 139 in the housing means 134 which is also fluidly interconnected to the conduit 113A that leads to the nozzle means 104A as well as to the valve seat 131 of the device 108A.

Therefore, it can be seen that the minimum air flow rate device 109A prevents the pressure value in the conduit 92A from falling below a minimum pressure value as set by the compression pring 137 which closes the ball valve member 136 against the valve seat 135 when the bimetal member 107A is disposed in its fully open position relative to the nozzle 104A. The maximum air flow rate setting device 190A prevents the pressure value in the conduit 92A from exceeding a maximum pressure as set by the member 133 thereof as the ball valve member 130 will move off of the valve seat 131 in opposition to the force of the compression spring 132 when the pressure value in the conduit 92A exceeds that maximum value of the setting of the device 108A when the bimetal member 107A is completely closing the nozzle 104A.

Thus, the thermostat 91A and devices 108A and 109A operate in the same manner as the thermostat 91 and devices 108 and 109 when utilized in the system 70 so that the operation of the thermostat 91A in the system 70 need not be set forth.

Therefore, it can be seen that this invention provides improved means for permitting the maximum and minimum air flow rate setting devices to be disposed remote from the controller of the system and be readily accessible in the area being conditioned by the air of the system, and, in particular, by providing an arrangement wherein the maximum and minimim air flow rate setting devices are carried by the thermostat of the system for controlling the range of the air flow rate thereof in the manner previously set forth.

Accordingly, it can be seen that this invention not only provides an improved system for supplying conditioned air through duct means to an area to be treated by the conditioned air and a method of making such a system, but also this invention provides an improved thermostat for such a system or the like.

While the forms and methods of this invention now preferred have been illustrated and described as required by the Patent Statute, it is to be understood that other forms and method steps can be utilized and still fall within the scope of the appended claims.

What is claimed is:

1. In a system for supplying conditioned air through duct means to an area to be treated by said conditioned air, said system comprising an area thermostat that tends to maintain the temperature of said area at a selected set point temperature of said thermostat, said thermostat having means providing a signal in relation to the temperature sensed by said thermostat, a damper means operated by damper operating means for controlling the flow of air from said duct means to said area, a controller non-readily accessible in said area and being remote from said thermostat and from said damper operating means, said controller having means for directing a signal to said damer operating means to operate the same in relation to the value of said signal of said thermostat and in relation to the air pressure in said duct means to compensate for pressure changes originating elsewhere in the system whereby said controller tends to maintain the air flow to said area at the rate called for by said signal of said thermostat regardless of the air pressure in said duct means, and adjustable maximum and minimum air flow rate setting devices for selecting the air flow rate range of said air flow from said duct means to said area under the control of said controller, the improvement wherein said adjustable maximum and minimum air flow rate setting devices are remote from said controller and are readily accessible in said area, said maximum and minimum air flow rate setting devices being operatively associated with said thermostat to select the range of said signal thereof and, thus, the range of the rate of the air flow from said duct means.

2. A system as set forth in claim 1 wherein said thermostat has a housing means, said maximum and minimum air flow rate setting devices being disposed in said housing means.

3. A system as set forth in claim 2 wherein said signals of said thermostat and said controller are respectively pneumatic signals, said thermostat having a bleed means that determines the pressure value of said pneumatic signal thereof, said thermostat having passage means for interconnecting a pneumatic source and said controller to said bleed means, said maximum and minimum air flow rate setting devices comprising valve means interconnected to said passage means.

4. A system as set forth in claim 3 wherein said valve means comprise needle valve means.

5. A system as set forth in claim 3 wherein said valve means comprise spring biased ball valve means.

6. In a system for supplying conditioned air through duct means to an area to be treated by said conditioned air, said system comprising an area thermostat that tends to maintain the temperature of said area at a selected set point temperature of said thermostat, said thermostat having means providing a pneumatic signal in relation to the temperature sensed by said thermostat, a pneumatically operated damper means for controlling the flow of air from said duct means to said area, a controller having means for directing a pneumatic signal to said damper means to operate the same in relation to the pressure of said pneumatic signal of said thermostat and in relation to the air pressure in said duct means to compensate for pressure changes originating elsewhere in the system whereby said controller tends to maintain the air flow to said area at the rate called for by said pneumatic signal of said thermostat regardless of the air pressure in said duct means, and adjustable maximum and minimum air flow rate setting devices for selecting the air flow rate range of said air flow from said duct means to said area under the control of said controller, the improvement wherein said adjustable maximum and minimum air flow rate setting devices are remote from said controller and are readily accessible in said area, said maximum and mininum air flow rate setting devices being operatively associated with said thermostat to select the pressure range of said pneumatic signal thereof and, thus, the range of the rate of the air flow from said duct means, said thermostat having a housing means, said maximum and minimum air flow rate setting devices being disposed in said housing means, said thermostat having a bleed means that determines the pressure value of said pneumatic signal thereof, said thermostat having passage means for interconnecting a pneumatic source and said controller to said bleed means, said maximum and minimum air flow rate setting devices comprising valve means interconnected to said passage means, said minimum air flow rate setting device effectively disconnecting said bleed means from said passage means when said bleed means causes the pressure in said passage means to fall to a pressure value that corresponds to the pressure value setting of said minimum air flow rate setting device, said maximum air flow rate setting device effectively venting said passage means when the pressure in said passage means rises to a pressure value that corresponds to the pressure value setting of said maximum air flow rate setting device.

7. In a method of making a system for supplying conditioned air through duct means to an area to be treated by said conditioned air, said method comprising the steps of providing an area thermostat that tends to maintain the temperature of said area at a selected set point temperature of said thermostat, forming said thermostat to have means providing a signal in relation to the temperature sensed by said thermostat, providing a damper means operated by damper operating means for controlling the flow of air from said duct means to said area, forming a controller to be non-readily accessible in said area and be remote from said thermostat and from said damper operating means, forming said controller with means for directing a signal to said damper operating means to operate the same in relation to the value of said signal of said thermostat and in relation to the air pressure in said duct means to compensate for pressure changes originating elsewhere in the system whereby said controller will be adapted to tend to maintain the air flow to said area at the rate called for by said signal of said thermostat regardless of the air pressure in said duct means, and providing adjustable maximum and minimum air flow rate setting devices for selecting the air flow rate range of said air flow from said duct means to said area under the control of said controller, the improvement comprising the steps of forming said adjustable maximum and minimum air flow rate setting devices to be remote from said controller and to be readily accessible in said area, and forming said maximum and minimum air flow rate setting devices to be operatively associated with said thermostat so as to select the range of said signal thereof and, thus, the range of the rate of the air flow from said duct means.

8. A method as set forth in claim 7 and including the steps of forming said thermostat to have a housing means, and disposing said maximum and minimum air flow rate setting devices in said housing means.

9. A method as set forth in claim 8 and including the steps of forming said thermostat and said controller so that the respective signals thereof are pneumatic signals, forming said thermostat to have a bleed means that determines the pressure value of said pneumatic signal thereof, forming said thermostat to have passage means for interconnecting a pneumatic source and said controller to said bleed means, and forming said maximum and minimum air flow rate setting devices to comprise valve means interconnected to said passage means.

10. A method as set forth in claim 9 and including the step of forming said valve means to comprise needle valve means.

11. A method as set forth in claim 9 and including the step of forming said valve means to comprise spring biased ball valve means.

12. In a method of making a system for supplying conditioned air through duct means to an area to be treated by said conditioned air, said method comprising the steps of providing an area thermostat that tends to maintain the temperature of said area at a selected set point temperature of said thermostat, forming said thermostat to have means providing a pneumatic signal in relation to the temperature sensed by said thermostat, providing a pneumatically operated damper means for controlling the flow of air from said duct means to said area, forming a controller with means for directing a pneumatic signal to said damper means to operate the same in relation to the pressure of said pneumatic signal of said thermostat and in relation to the air pressure in said duct means to compensate for pressure changes originating elsewhere in the system whereby said controller will be adapted to tend to maintain the air flow to said area at the rate called for by said pneumatic signal of said thermostat regardless of the air pressure in said duct means, and providing adjustable maximum and minimum air flow rate setting devices for selecting the air flow rate range of said air flow from said duct means to said area under the control of said controller, the improvement comprising the steps of forming said adjustable maximum and minimum air flow rate setting devices to be remote from said controller and to be readily accessible in said area, forming said maximum and minimum air flow rate setting devices to be operatively associated with said thermostat so as to select the pressure range of said pneumatic signal thereof and, thus, the range of the rate of the air flow from said duct means, forming said thermostat to have a housing means, disposing said maximum and minimum air flow rate setting devices in said housing means, forming said thermostat to have a bleed means that determines the pressure value of said pneumatic signal thereof, forming said thermostat to have passage means for interconnecting a pneumatic source and said controller to said bleed means, forming said maximum and minimum air flow rate setting devices to comprise valve means interconnected to said passage means, forming said minimum air flow rate setting device to effectively disconnect said bleed means from said passage means when said bleed means causes the pressure in said passage means to fall to a pressure value that corresponds to the pressure value setting of said minimum air flow rate setting device, and forming said maximum air flow rate setting device to effectively vent said passage means when the pressure in said passage means rises to a pressure value that corresponds to the pressure value setting of said maximum air flow rate setting device.

13. In a thermostat for a system that supplies conditioned air through duct means to an area to be treated by said conditioned air, said conditioned air being controlled by duct damper means operated by damper operating means said thermostat being adapted to tend to maintain the temperature of said area at a selected set point temperature of said thermostat, said thermostat having means for providing a signal in relation to the temperature sensed by said thermostat so that said signal can be directed to a controller that is non-readily accessible in said area and is remote from said thermostat and from said damper operating means and has means for directing a signal to said damper operating means to operate the same in relation to the value of said signal of said thermostat and in relation to the air pressure in said duct means to compensate for pressure changes originating elsewhere in the system whereby said controller will tend to maintain the air flow to said area at the rate called for by said signal of said thermostat regardless of the air pressure in said duct means, said system having adjustable maximum and minimum air flow rate setting devices for selecting the air flow rate range of said air flow from said duct means to said area under the control of said controller, the improvement wherein said adjustable maximum and minimum air flow rate setting devices are carried by said thermostat so as to be remote from said controller and be readily accessible in said area, said maximum and minimum air flow rate setting devices being operatively associated with said thermostat to select the range of said signal thereof and, thus, the range of the rate of the air flow from said duct means.

14. A thermostat as set forth in claim 13 wherein said thermostat has a housing means, said maximum and minimum air flow rate setting devices being disposed in said housing means.

15. A thermostat as set forth in claim 14 wherein said signals of said thermostat and said controller are respectively pneumatic signals and said thermostat has a bleed means that determines the pressure value of said pneumatic signal thereof, said thermostat having passing means for interconnecting a pneumatic source and said controller to said bleed means, said maximum and minimum air flow rate setting devices comprising valve means interconnected to said passage means.

16. A thermostat as set forth in claim 15 wherein said valve means comprise needle valve means.

17. A thermostat as set forth in claim 15 wherein said valve means comprise spring biased ball valve means.

18. In a thermostat for a system that supplies conditioned air through duct means to an area to be treated by said conditioned air, said thermostat being adapted to tend to maintain the temperature of said area at a selected set point temperature of said thermostat, said thermostat having means for providing a pneumatic signal in relation to the temperature sensed by said thermostat so that said signal can be directed to a controller having means for directing a pneumatic signal to a pneumatically operated duct damper means to operate the same in relation to the pressure of said pneumatic signal of said thermostat and in relation to the air pressure in said duct means to compensate for pressure changes originating elsewhere in the system whereby said controller will tend to maintain the air flow to said area at the rate called for by said pneumatic signal of said thermostat regardless of the air pressure in said duct means, said system having adjustable maximum and minimum air flow rate setting devices for selecting the air flow rate range of said air flow from said duct means to said area under the control of said controller, the improvement wherein said adjustable maximum and minimum air flow rate setting devices are carried by said thermostat so as to be remote from said controller and be readily accessible in said area, said maximum and minimum air flow rate setting devices being operatively associated with said thermostat to select the pressure range of said pneumatic signal thereof and, thus, the range of the rate of the air flow from said duct means, said thermostat having a housing means, said maximum and minimum air flow rate setting devices being disposed in said housing means, said thermostat having a bleed means that determines the pressure value of said pneumatic signal thereof, said thermostat having passage means for interconnecting a pneumatic source and said controller to said bleed means, said maximum and minimum air flow rate setting devices comprising valve means interconnected to said passage means, said minimum air flow rate setting device being adapted to effectively disconnect said bleed means from said passage means when said bleed means causes the pressure in said passage means to fall to a pressure value that corresponds to the pressure value setting of said minimum air flow rate setting device, said maximum air flow rate setting device being adapted to effectively vent said passage means when the pressure in said passage means rises to a pressure value that corresponds to the pressure value setting of said maximum air flow rate setting device.

* * * * *